United States Patent [19]
Thompson

[11] 3,834,539
[45] Sept. 10, 1974

[54] TRAP FOR REMOVING SOLID PARTICLES FROM A LIQUID CIRCULATING SYSTEM

[76] Inventor: Claude W. Thompson, 654 Shawnee, Houston, Tex. 77034

[22] Filed: Dec. 26, 1972

[21] Appl. No.: 318,140

[52] U.S. Cl................. 210/167, 210/223, 210/310, 210/447
[51] Int. Cl........................................ B01d 29/36
[58] Field of Search ........... 210/167, 223, 299, 308, 210/310, 447

[56] References Cited
UNITED STATES PATENTS

| | | | |
|---|---|---|---|
| 2,034,242 | 3/1936 | Mautner | 210/310 |
| 3,363,764 | 1/1968 | Whitaker | 210/310 X |
| 3,372,807 | 3/1968 | Barnard | 210/310 X |

*Primary Examiner*—Frank A. Spear, Jr.
*Assistant Examiner*—Richard W. Burks
*Attorney, Agent, or Firm*—Michael P. Breston

[57] ABSTRACT

This invention relates to a trap for removing solid particles from a liquid flowing in a conduit. The trap comprises a filter element disposed across the conduit at an angle sloping rearwardly with respect to the direction of liquid flow in the conduit. A receptacle communicates with the conduit rearwardly adjacent to the lower end of the filter element.

2 Claims, 6 Drawing Figures

PATENTED SEP 10 1974 3,834,539

TRAP FOR REMOVING SOLID PARTICLES FROM A LIQUID CIRCULATING SYSTEM

BACKGROUND OF THE INVENTION

This invention has general application to liquid circulation systems whenever liquid flowing through a conduit contains foreign solid particles of undesirable dimensions. One such liquid circulation system is found in a water-cooled internal combustion engine. Accordingly, the following description of this invention will be particularly directed to a water-cooled internal combustion engine and it will be understood that this invention is not limited thereto.

When water is circulated between the engine's block and the radiator, it is well-known that the radiator's efficiency gradually decreases as a result of the accumulation of solid particles within the radiator's internal tubes. Such particles may comprise ferrous and non-ferrous solid materials mostly emanating from the engine's block. Even relatively new automobiles are subjected to continuous corrosion, and the periodic flushing and draining of the radiator and the use of anti-corrosion chemicals do not prevent the radiator from becoming clogged up by foreign solid materials. Repairing and cleaning an automobile radiator is a relatively expensive operation, and some such radiators become permanently damaged beyond repair.

U.S. Pat. No. 2,964,190 proposes the use of a permanent magnet disposed within the water hose which is connected at its opposite ends between the water side of the engine block and the top of the radiator. While a permanent magnet may attract some ferrous materials it has no effect on non-ferrous materials which are free to pass from the engine's block into the tubes of the radiator. In addition the positioning of a solid permanent magnet within the liquid flow stream is likely to cut off the water circulation between the engine and the radiator, thereby causing over heating.

U.S. Pat. No. 2,580,012 proposes a water filtering trap employing a fine mesh screen of cylindrical configuration located within the trap having an inlet and an outlet with the inlet being elevated relative to the outlet. The screen is constructed as a cartridge with both ends closed by the wire mesh to allow the positioning therein of a water-softening material. While I am not aware that such a device has ever been commericially employed, its filtering element would become easily clogged up, since the water pressure of the flowing stream would cause the foreign solid particles to press against the openings in the screen.

Accordingly, it is a main object of my invention to provide a new and improved trap for removing solid particles greater than a predetermined size from a liquid-circulation system such as, for example, a water-cooled internal combustion engine. The main characteristics of my new and improved trap are that the trap is very effective, it is easy to install, inexpensive to manufacture, and from which the filtered out solid particles can be easily removed by the car owner himself.

SUMMARY OF THE INVENTION

This invention provides a trap for removing solid particles greater than a predetermined size from a liquid circulation system such as in a water-cooled internal combustion engine. The trap comprises a filter element which is disposed across the conduit at an angle sloping rearwardly with respect to the direction of fluid flow in the conduit. A downwardly-directed receptacle communicates with the conduit. The receptacle is rearwardly adjacent to the lower end of the filter element to cause the trapped foreign solid particles to fall by gravity from the filter element into the receptacle.

BRIEF DESCRIPTION OF THE DRAWINGS

In the drawings the same reference characters are used to designate the same or similar parts.

Referring now to FIGS. 1-3, there is shown a water-cooled internal combustion system 10 comprising an engine block 12, a radiator 14, and a pump 16 for circulating water between the engine and the radiator through a flexible top water hose 18 and a bottom water hose 19. The opposite ends of water hose 18 are clampingly connected between the top of radiator 14 and the water outlet of engine block 12 by clamps 13. Intermediate the ends of the flexible water hose 18 is inserted a trap, generally designated as 20, secured thereto by clamps 21. Trap 20 conveniently may comprise a T-shaped, tubular, metalic housing 22 having a horizontal tubular top portion 23 and a downwardly-directed, bottom tubular leg portion 24. The water flowing through trap 20 is in the direction of the arrows 25.

Figure 1:
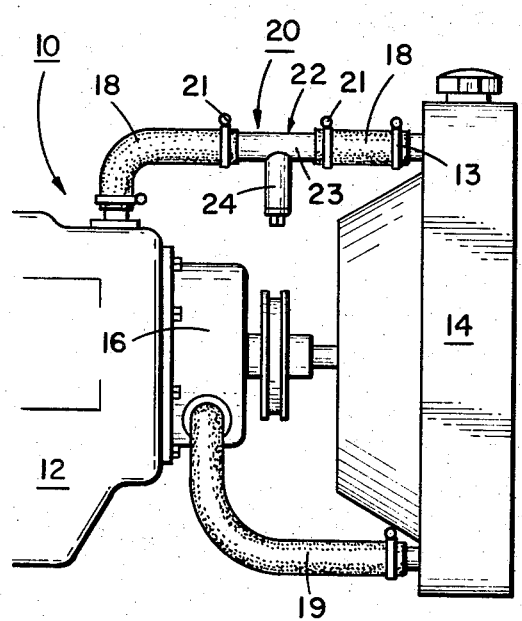
FIG. 1 shows a water-cooled internal combustion engine employing a conduit comprising the trap of this invention.
Figure 2:
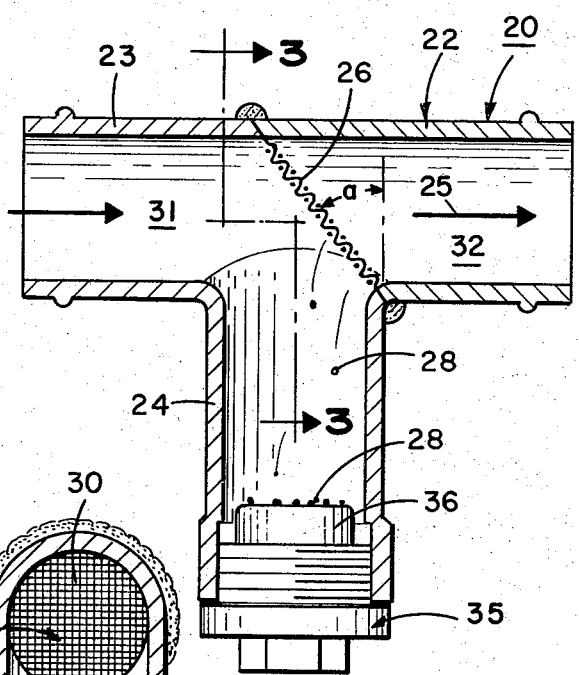
FIG. 2 is a sectional view of one embodiment of the trap of this invention.
Figure 3:
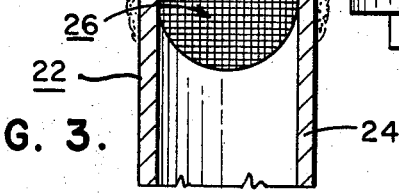
FIG. 3 is a view on line 3—3 in FIG. 2.

A filter element, which in its simplest form is a flat screen 26, is disposed across the top tube 23 at an angle sloping rearwardly with respect to the direction of liquid flow in tube 23. This angle is designated in FIG. 2 as $a$, and is shown as being approximately 45°. It was found experimentally that angle $a$ may range between 30° and 75° with optimum results being obtained when angle $a$ is approximately 45°.

The leg 24 of the T-shaped trap 20 serves as a receptacle for the solid particles 28 which are too large to pass through the openings 30 in the screen 26. As will be seen from the drawings, water can freely flow from the upstream section 31 to the receptacle 24 without passing through screen 26, while no water can flow from the downstream section 32 to the upstream section 31 without passing through the screen 26. A threaded plug 35 is threadedly secured to the open bottom end of receptacle 24.

In operation, trap 20 is inserted between the free ends of the flexible hose 18 and clamped thereto by clamps 21 so as to make a leak-proof connection. As the water circulates between the engine block and the radiator in the direction of water flow 25, any solid particles contained in the water, which are larger than the openings 30 in screen 26, will be reflected from the screen downwardly and by gravity will move in the direction of plug 35. A magnet 36 may be positioned on top of plug 35 to aid in attracting the ferrous solid particles 28. Also, it is a known fact that when water circulation stops, after the engine is cut off, the portion of the water hose 18, connected to the water outlet of the engine block, partially collapses as a result of a vacuum formed therein. This vacuum pulls away whatever particles 28 became stuck to the screen 26 and such particles will fall by gravity into the receptacle 24.

The material for housing 22 is preferably a non-corrosive, non-magnetic metal. The screen's material may be copper or bronze or of another non-corrosive metal and the screen's openings are selected so as to the least interfere with the water flow and yet allow larger than predetermined size solid particles to become filtered out. The particles from receptacle 24 are periodically removed by the car owner by merely unscrewing plug 35 and emptying the contents of receptacle 24. It will be appreciated that the positioning of the screen at an angle across the main water flow path in the water conduit, allows the screen to be self-cleaning by the water flowing therethrough, a characteristic which was lacking in prior art screens of similar devices.

Figure 4:
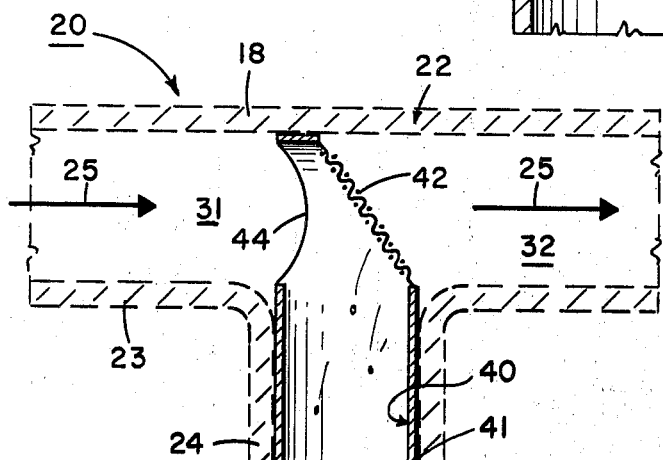
FIG. 4 is a partial and sectional view of another embodiment of this invention.
Figure 5:
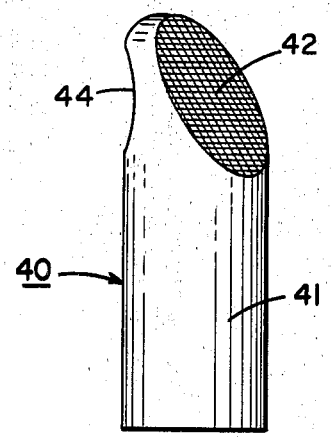
FIG. 5 is a view in perspective of the filter element in the trap of FIG. 4.
Figure 6:
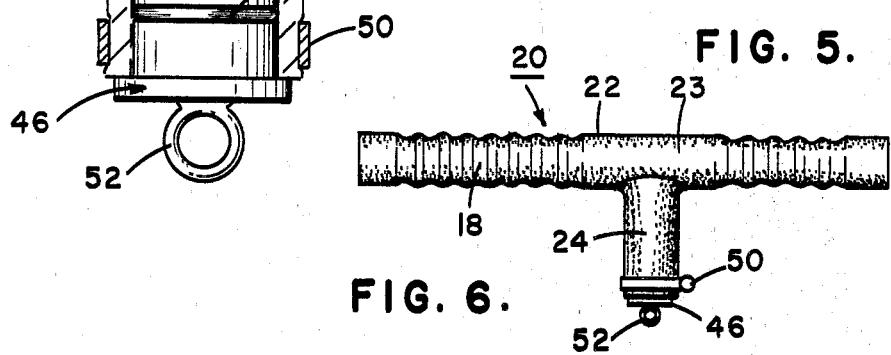
FIG. 6 is a view in perspective of the liquid conduit embodying the trap shown in FIG. 4.

Refering now more specifically to FIGS. 4–6, the trap 20 may be built into and form integral part with the flexible water hose 18 (FIG. 6). A filter insert, generally designated as 40, comprising a bottom cylindrical receptacle 41 terminated by a sloping screen element 42. The portion of tube 41 opposite screen 42 has a cylindrical opening 44 communicating with the upstream section 31 of hose 18 so that liquid may flow from the upstream section to the downstream section 32 without interference except by the screen 42 itself. A bottom plug 46 having a suitable O-ring 48 is inserted in the bottom leg 24 of trap 20 and is clamped thereto by a clamp 50. Plug 46 pushes tube 40 upwardly as shown in FIG. 4. The plug has a ring 52 which facilitates its removal from the trap 20. The solid particles trapped by the screen 42 become contained in cylinder 41, as previously described.

Other embodiments than those described will readily become apparent to those skilled in the art, all falling within the scope of the claims appended hereto:

What I claim is:

1. A flexible water hose having a horizontal leg and a vertical downwardly extending leg, said hose being adapted for coupling between a water-cooled engine block and its radiator, the opposite ends of the horizontal leg being clampingly connectable between the top of the radiator and the top water outlet of the engine block;

a screen element disposed across the horizontal leg opposite the mouth of the vertical leg and at an angle sloping rearwardly with respect to the direction of liquid flow in the horizontal leg, whereby solid particles contained in the liquid which are larger than the openings in the screen will be reflected from the screen downwardly into the vertical leg, and a magnet positioned at the bottom of said vertical leg for attracting ferrous particles contained in the circulating liquid thereby preventing the ferrous particles from returning to the engine block when liquid circulation stops.

2. The hose of claim 1 wherein said screen is at an angle of 45°.

* * * * *